United States Patent Office 2,823,137
Patented Feb. 11, 1958

2,823,137

TINCTORIALLY STRONG, NON-FLOCCULATING PHTHALOCYANINE PIGMENTS

André Pugin, Basel, Switzerland, assignor to J. R. Geigy A. G., Basel, Switzerland, a Swiss firm No Drawing. Application December 15, 1955
Serial No. 553,213

Claims priority, application Switzerland
December 23, 1954

3 Claims. (Cl. 106—288)

The present invention concerns tinctorially strong, stable, fast-to-xylene phthalocyanine pigments which do not flocculate in organic lacquers and solvents therefor. It also concerns processes for the production of such stable pigments, processes for the production of fast dyed lacquers and coatings by the use of these stable phthalocyanine pigments as well as, as industrial product, the material fast dyed with the aid of such pigments.

Because of their slight stability in lacquers, many known phthalocyanine pigments have not attained the technical importance which was to be expected in view of their otherwise valuable properties. This is particularly true of the copper phthalocyanine of the finely dispersed α-form which is distinguished by its valuable reddish-blue shade, which can be obtained from the crude, coarsely dispersed β-form by finely grinding in the presence of solid grinding substrata such as anhydrous inorganic or organic salts like calcium chloride, potassium ferrocyanide, sodium acetate, or which can be obtained by dilution of the solution in concentrated sulphuric acid with water. This abundant reddish-blue α-form of the copper phthalocyanine has the undesirable property of agglomerating when in contact with lacquer solvents, i. e. of flocculating in the form of coarsely dispersed aggregates or crystals, which results in a great diminution or weakening of the tinctorial strength and a more green colour. This disadvantage is particularly apparent if these instable copper phthalocyanine pigments are blended with white pigments such as titanium dioxide or zinc oxide.

There are already many known processes for the stabilising of the valuable reddish-blue, finely dispersed α-copper phthalocyanine against the influence of lacquer solvents. One suggestion for example concerns the admixture of aluminium benzoate to α-copper phthalocyanine pigment in the production of coloured lacquers. This method has the disadvantage of necessitating larger amounts of aluminum benzoate to stabilise the phthalocyanine pigment so that the tinctorial strength of the latter is greatly reduced. A further suggestion concerns the treatment of copper phthalocyanine pigments with anhydrous aluminium chloride, either in the melt or in inert organic solvents such as polychlorobenzenes at a raised temperature while subsequently precipitating the pigment from concentrated sulphuric acid. This method is laborious and costly. A further suggestion concerns the production of homogeneous mixtures consisting of finely dispersed copper phthalocyanine of the α-form as main component and tin phthalocyanine. If, in this process, crude β-form copper phthalocyanine is used as starting material and it is mixed with tin phthalocyanine by grinding the components, then pigments are obtained which are not stable in boiling xylene. Thus, provided it is desired to obtain pigments which are stable to boiling xylene, copper phthalocyanine precipitated from sulphuric acid must be used in this process.

In contrast to the above, it has been found that valuable, abundant phthalocyanine pigments which are stable in lacquer solvents can be produced if halogen-free or weakly halogenated, metal-free phthalocyanines or those containing heavy metals of the atomic numbers 27–29 are homogeneously mixed as main component with tin phthalocyanines and aluminium and/or titanium and/or iron phthalocyanines.

Particularly valuable phthalocyanine pigments according to the present invention are obtained from copper phthalocyanine which can possibly contain monohalogen copper phthalocyanine remaining from the production process. Also the monochloro- or monobromo-copper phthalocyanines, as well as the metal-free and possibly monohalogenated phthalocyanine, and the halogen-free or monohalogenated cobalt and nickel phthalocyanines are attainable by the same process.

In the preferred case of copper phthalocyanine, the particular technical advantage of the new process consists in that crude coarsely dispersed copper phthalocyanine of the β-form such as results as end product in the usual phthalocyanine syntheses can be used direct as starting product. The homogeneous mixing of the aluminium and tin phthalocyanines or of the titanium and tin phthalocyanines or of the iron and tin phthalocyanines is performed advantageously by milling the pigments. In the same operation also the finely dispersed α-form of copper phthalocyanine is formed by the usual methods, in particular on milling in the presence of easily removable milling substrata such as anhydrous inorganic or organic salts or mixtures thereof, e. g. in the presence of sodium sulphate, calcium chloride, potassium ferrocyanide, sodium acetate, etc. After eliminating the milling substrata in aqueous solution, thus, in one operation, highly dispersed α-copper phthalocyanine pigments of the desired reddish-blue shade are obtained which, due to their slight content of homogeneously admixed aluminium or titanium or iron and tin phthalocyanine are excellently stable in contact with lacquer solvents, also on heating. Whilst this process is the preferred technical method, it is naturally also possible within the scope of the invention to use finely dispersed, for example, α-copper phthalocyanine obtained by precipitation from sulphuric acid solution instead of the coarsely dispersed β-copper phthalocyanine. Also only one of the two additives can first be incorporated for example by precipitating the solution of copper phthalocyanine and aluminium phthalocyanine in concentrated sulphuric acid by diluting with water, the precipitate being in a finely dispersed form and only then homogeneously incorporating the tin phthalocyanine, e. g. by milling the mixture. Possibly also homogeneous mixtures of two components can be produced by milling or other means and then, in a separate step, the third component can be mixed in. Also mixtures consisting of the main component and one of the stabilising additives can be further mixed with a mixture of the main component and another of the stabilising additives. Also the simultaneous precipitation of all three phthalocyanines from concentrated sulphuric acid by dilution with water produces stabilised pigment mixtures. Under all circumstances in these processes care must be taken to ensure that the end product is obtained as the most uniform, even and finely dispersed mixture possible.

Independent of the mixing method, the three phthalocyanine components should be used in such amounts that the main component forms at least 80% of the mixture. The quantities of the additives can be, for example 0.1 to 5% of tin phthalocyanine and 1 to 10% of aluminium, titanium or iron phthalocyanine. 0.5 to 3% of tin phthalocyanine and 1 to 10% of aluminium or titanium or iron phthalocyanine are favourable proportions. It is of advantage if the total amount of stabilising additives is from 5 to 10% of the mixture, but care should be taken to ensure that the ratio of tin phthalocyanine to the phthalocyanines of aluminium, titanium and iron is kept between 1:10 and 10:1.

The new copper phthalocyanine pigments are superior to all previously known similar pigments with regard to the reddish tinge of the blue shade, the stability in lacquer solvents and lacquers as well as in the transparency of the nitro-lacquers; also they do not tend to separate when mixed with the usual white pigments.

What has been said regarding the preferred copper phthalocyanines is also true of the metal-free phthalocyanine as well as of the halogen-free or monohalogenated cobalt and nickel phthalocyanines.

The following examples serve to illustrate further the subject of the invention without, however, limiting it in any way. Where not otherwise stated, parts are given as parts by weight and the temperatures are in degrees centigrade. The relationship of parts by weight to parts by volume is as that of kilogrammes to litres.

*Example 1*

94 parts of crude copper phthalocyanine containing no chlorine, 3 parts of aluminium phthalocyanine and 3 parts of tin phthalocyanine are milled with 250 parts of anhydrous calcium chloride and 20 parts of anhydrous sodium acetate for 100 hours with iron balls. The milled mixture is pasted in 3000 parts of a hot, diluted hydrochloric acid solution, the pigment is filtered off, washed free of salt with water and dried.

Incorporated into a dammar lacquer of the following composition:

0.5 part pigment
12 parts titanium dioxide
20 parts of dammar resin
30 parts xylene after milling for 24 hours with porcelain balls, the pigment so produced has a much redder, purer and about a 30% stronger blue nuance than a crude copper phthalocyanine produced under the same conditions but without the addition of salt-milled aluminium and tin phthalocyanine.

After boiling the new pigment for two hours in xylene, under the microscope it still seems to be amorphous and still has its reddish nuance which is not the case with salt-milled pigments obtained from crude copper phthalocyanine and 3 or even 6% of tin phthalocyanine but which do not contain aluminium phthalocyanine. The new pigment is distinguished in nitro lacquers by an excellent stability as well as the brightness of the full shade which it produces.

Similar good results are obtained if in this example 3 parts of titanium phthalocyanine or iron phthalocyanine are used instead of 3 parts of aluminum phthalocyanine. Pigments with a more greenish nuance but with equally good stability to xylene and in nitro-lacquers are obtained if in this example, monochloro-copper phthalocyanine, metal-free phthalocyanine, crude nickel or crude cobalt phthalocyanine are milled with the same amounts of aluminium and tin phthalocyanine instead of the chlorine-free crude copper phthalocyanine.

The copper, nickel, cobalt, aluminium, iron, titanium and tin phthalocyanines can be produced according to the processes described in the literature.

*Example 2*

95 parts of a chlorine-free copper phthalocyanine precipitated from concentrated sulphuric acid, 4.1 parts of aluminium phthalocyanine, 0.9 part of tin phthalocyanine are ground with 300 parts of anhydrous calcium chloride and 5 parts of glycerine monostearic acid ester for 60 hours with iron balls.

The milled mixture is pasted in 3000 parts of a hot diluted hydrochloric acid solution, the pigment is filtered off, washed salt-free with water and dried.

After boiling the new pigment for two hours in xylene, under the microscope it still looks amorphous and still retains its reddish nuance. Radiographic trials showed that the mixed pigment both boiled in xylene and not boiled had completely the structure of the α-form, whilst coarse greenish crystals of the β-form resulted from boiling the precipitated copper phthalocyanine starting product.

The mixed pigment produced according to this example has very good stability and great brightness in nitro-lacquers.

Mixed pigments of similar stability but with a more greenish shade are obtained if in this example chlorine-free, precipitated copper phthalocyanine is replaced by precipitated, metal-free or cobalt or nickel phthalocyanine, or if the monochlorine derivatives of the above metal phthalocyanines are used.

*Example 3*

50 parts of crude copper phthalocyanine are dissolved with 3 parts of aluminium phthalocyanine and 1 part of tin phthalocyanine in 500 parts of 96% sulphuric acid at room temperature and the solution is poured into a lot of water. The precipitated pigment is filtered off, washed neutral in water, stirred with 1000 parts of water with the addition of 2 parts of sodium carbonate and 2 parts of triethanolamine salt of oleic acid for 2 hours, whereupon it is filtered off, washed and dried.

Also the same number of parts of monochloro-copper phthalocyanine can be used instead of the crude copper phthalocyanine.

The mixed pigment so obtained is distinguished by better stability in nitro-lacquers and better fastness to xylene than a simple copper phthalocyanine precipitated from sulphuric acid.

*Example 4*

94 parts of crude nickel phthalocyanine, 2 parts of aluminium phthalocyanine, 2 parts of titanium phthalocyanine, 2 parts of tin phthalocyanine are ground with iron balls with 500 parts of anhydrous calcium chloride for 120 hours. After pasting the milled product in hot water, the pigment is filtered off, washed free of salt and dried.

In lacquers containing aromatic solvents, it produces a strong blue slightly greenish nuance and in nitrocellulose lacquers it only has a slight tendency to separate from titanium dioxide. Pigments with the same properties are obtained if in this example instead of 2 parts of aluminium or titanium phthalocyanine, 2 parts of iron phthalocyanine are used.

A redder pigment which is fast to solvents is obtained if in this example the crude nickel phthalocyanine is replaced by 94 parts of crude or precipitated copper phthalocyanine.

*Example 5*

A nitrotoluene lacquer is prepared by dissolving 170 parts of collodion cotton moistened up to 36% with butanol in 295 parts of butyl acetate, 105 parts of glycol monoethyl ether and 430 parts of toluene. 5 parts of butyl acetate, 5 parts of toluene, 6 parts of dibutyl phthalate, 0.75 part of the pigment produced according to Example 2, and 9 parts of titanium dioxide (anatase) are added to 70 parts of this solution. This lacquer is ground for 48 hours in a ball mill. The finished lacquer is poured immediately, as well as after 20 days' storing onto aluminium sheets and is also sprayed on with the pistol. There is no difference in shade or strength of the dried lacquers and they are distinguished by their economy in use.

What I claim is:

1. A colouring composition being characterised by stability against flocculation when incorporated in a liquid pigmenting composition containing aromatic hydrocarbon lacquer solvent, consisting essentially of a copper phthalocyanine in admixture with a quantity of tin phthalocyanine corresponding to 0.5 to 5% by weight of said composition and with 1 to 10% by weight of said composition of a member selected from the group consisting of aluminium phthalocyanine and a mixture of aluminium phthalocyanine and titanium phthalocyanine, the quantity of phthalocyanine containing tin, aluminium and titanium being at least 2% by weight of said composition.

2. A colouring composition being characterised by stability against flocculation when incorporated in a liquid pigmenting composition containing aromatic hydrocarbon lacquer solvent, consisting essentially of a copper phthalocyanine in admixture with a quantity of tin phthalocyanine corresponding to 0.5 to 5% by weight of said composition and with a quantity of both aluminium and titanium phthalocyanine corresponding to 1 to 5% by weight of said composition.

3. A colouring composition being characterised by stability against flocculation when incorporated in a liquid pigmenting composition containing aromatic hydrocarbon lacquer solvent, consisting of 94% by weight of copper phthalocyanine, 3% by weight of tin phthalocyanine and 3% by weight of aluminium phthalocyanine.

References Cited in the file of this patent
UNITED STATES PATENTS

| | | |
|---|---|---|
| 2,192,704 | Dahlen | Mar. 5, 1940 |
| 2,327,472 | Vesce | Aug. 24, 1943 |
| 2,439,222 | Scalera et al. | Apr. 6, 1948 |
| 2,476,950 | Beard | July 26, 1949 |
| 2,476,951 | Beard | July 26, 1949 |
| 2,476,952 | Beard | July 26, 1949 |
| 2,526,345 | Giambalvo | Oct. 17, 1950 |